(12) United States Patent
Obuchi et al.

(10) Patent No.: US 10,622,634 B2
(45) Date of Patent: *Apr. 14, 2020

(54) LEAD-ACID BATTERY AND METHOD FOR PRODUCING LEAD-ACID BATTERY

(71) Applicant: GS Yuasa International Ltd., Kyoto-shi, Kyoto (JP)

(72) Inventors: Susumu Obuchi, Kyoto (JP); Ikumi Motoi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 35 days.

This patent is subject to a terminal disclaimer.

(21) Appl. No.: 15/577,468

(22) PCT Filed: May 20, 2016

(86) PCT No.: PCT/JP2016/002481
§ 371 (c)(1),
(2) Date: Nov. 28, 2017

(87) PCT Pub. No.: WO2016/194328
PCT Pub. Date: Dec. 8, 2016

(65) Prior Publication Data
US 2018/0151886 A1     May 31, 2018

(30) Foreign Application Priority Data

May 29, 2015   (JP) .................................. 2015-109832

(51) Int. Cl.
*H01M 4/62*   (2006.01)
*H01M 4/14*   (2006.01)
(Continued)

(52) U.S. Cl.
CPC ............. *H01M 4/627* (2013.01); *H01M 4/14* (2013.01); *H01M 4/20* (2013.01); *H01M 4/62* (2013.01);
(Continued)

(58) Field of Classification Search
CPC .......... H01M 4/627; H01M 4/14; H01M 4/16; H01M 4/20; H01M 4/62; H01M 4/73; H01M 10/12
See application file for complete search history.

(56) References Cited

U.S. PATENT DOCUMENTS

| 5,948,567 A | 9/1999 | Heller |
| 6,074,782 A | 6/2000 | Mizutani et al. |

(Continued)

FOREIGN PATENT DOCUMENTS

| JP | 58064763 A * | 4/1983 | ............. H01M 4/73 |
| JP | 08264202 | 10/1996 | |

(Continued)

OTHER PUBLICATIONS

PubChem, https://pubchem.ncbi.nlnn.nih.gov/compound/25113471#section=Top, accessed Jan. 14, 2019. (Year: 2019).*

(Continued)

*Primary Examiner* — Jonathan G Jelsma
(74) *Attorney, Agent, or Firm* — Rankin, Hill & Clark LLP (57) ABSTRACT

A negative electrode material of a negative electrode plate of a lead-acid battery includes an organic expander having a S element content of 3000 μmol/g or more.

10 Claims, 5 Drawing Sheets

(51) Int. Cl.
   *H01M 10/06* (2006.01)
   *H01M 4/73* (2006.01)
   *H01M 4/20* (2006.01)
   *H01M 10/12* (2006.01)
   *H01M 4/02* (2006.01)

(52) U.S. Cl.
   CPC ............. *H01M 4/73* (2013.01); *H01M 10/06* (2013.01); *H01M 10/12* (2013.01); *H01M 2004/027* (2013.01); *H01M 2220/20* (2013.01)

(56) References Cited

U.S. PATENT DOCUMENTS

| | | | |
|---|---|---|---|
| 6,346,347 B1* | 2/2002 | McNally | H01M 4/627 29/623.5 |
| 6,447,550 B1 | 9/2002 | Hunter | |
| 6,585,772 B2 | 7/2003 | Hunter | |
| 7,070,623 B2 | 7/2006 | Hunter | |
| 7,582,117 B2 | 9/2009 | Hunter | |
| 2008/0131774 A1* | 6/2008 | Tsuboi | H01M 4/661 429/209 |
| 2009/0325068 A1 | 12/2009 | Boden et al. | |
| 2017/0092934 A1 | 3/2017 | Ikumi | |

FOREIGN PATENT DOCUMENTS

| | | |
|---|---|---|
| JP | 09147871 | 6/1997 |
| JP | 2001511292 | 8/2001 |
| JP | 2003051307 A2 | 2/2003 |
| JP | 2003142085 A2 | 5/2003 |
| JP | 2004171982 A2 | 6/2004 |
| JP | 2008152955 A1 | 7/2008 |
| JP | 2013041848 A2 | 2/2013 |
| JP | 2013161606 A1 | 8/2013 |
| JP | 2014123525 A2 | 7/2014 |
| JP | 2015032479 A2 | 2/2015 |
| JP | 2015032480 A2 | 2/2015 |
| JP | 2015041496 A2 | 3/2015 |
| JP | 2015088379 A2 | 5/2015 |
| JP | 2015128053 A2 | 7/2015 |
| JP | 2016103422 A1 | 6/2016 |
| SU | 702434 | 12/1979 |
| WO | 9737393 | 10/1997 |

OTHER PUBLICATIONS

International Search Report dated Aug. 2, 2016 filed in PCT/JP2016/002481.

Hata et al., "Development of Vented Lead-acid Battery for Idling-stop Vehicles," GS Yuasa Technical Report, vol. 6 (1), 2009, pp. 7-13.; English abstract included.

Supplementary Partial European Search Report dated Jun. 25, 2019 issued in the corresponding European patent application No. 16802770.4.

* cited by examiner

LEAD-ACID BATTERY AND METHOD FOR PRODUCING LEAD-ACID BATTERY

TECHNICAL FIELD

The present invention relates to a lead-acid battery.

BACKGROUND ART

In a lead-acid battery for an idling-stop vehicle, the life of the battery may be ended due to breakage of a lug portion of a negative electrode plate. (Non-Patent Document 1: GS Yuasa Technical Report 6(1)7-13 (2009)).

A configuration of a negative electrode plate of a lead-acid battery will be described. An expanded grid, a punching grid, a casting grid and the like are known as current collectors. The expanded grid has frame ribs on the upper and lower parts of the grid, but has no frame ribs on the left and right parts. On the other hand, the cast grid and the punching grid each have frame ribs on the four peripheral sides of the grid. In addition, an organic expander such as lignin sulfonic acid or bisphenol condensation product is added to a negative electrode material. The organic expander prevents shrinkage of the negative electrode material, temporarily captures $Pb^{2+}$ ions during charge and discharge, and improves low-temperature high rate discharge performance.

PRIOR ART DOCUMENT

Patent Document

Non-Patent Document 1: GS Yuasa Technical Report 6(1)7-13 (2009)

SUMMARY OF THE INVENTION

Problems to be Solved by the Invention

An object of the present invention is to ensure that a lug portion of a negative electrode plate is hardly broken in a lead-acid battery for use in PSOC (a lead-acid battery used in a poor charged state). The lead-acid battery of the present invention is particularly suitable for use in idling-stop vehicle applications.

Means for Solving the Problems

One aspect of the present invention provides a lead-acid battery including a negative electrode material. The negative electrode material contains an organic expander. The organic expander contains a sulfur element (S element) in an amount of 3000 μmol/g or more. By setting the S element content to 3000 μmol/g or more, it can be ensured that the lead-acid battery is hardly broken at the lug in PSOC applications.

Another aspect of the present invention provides a lead-acid battery in which a powder sample obtained by taking out a negative electrode plate from the lead-acid battery, washing the negative electrode plate to remove a sulfuric acid component, separating a negative electrode material from the negative electrode plate freed of the sulfuric acid component, immersing the negative electrode material in a 1 mol/l NaOH aqueous solution, desalting the solution freed of an insoluble component by filtration, and then concentrating and drying the solution has a S element content of 3000 μmol/g or more. Thus, by measuring the S element content of the powder sample obtained in this procedure, the S element content of the organic expander contained in the negative electrode material can be measured. By setting the S element content of the power sample to 3000 μmol/g or more, it can be ensured that the lead-acid battery is hardly broken at the lug in PSOC applications.

Another aspect of the present invention provides a method for producing a lead-acid battery, the method including preparing a negative electrode. The negative electrode includes a negative electrode material. The negative electrode material contains an organic expander. The organic expander containing a sulfur element (S element) in an amount of 3000 μmol/g or more. Accordingly, it can be ensured that the lead-acid battery is hardly broken at the lug in PSOC applications.

Still another aspect of the present invention provides a method for producing a lead-acid battery. The method includes preparing a negative electrode in which a powder sample obtained by taking out a negative electrode from the lead-acid battery, washing the negative electrode to remove a sulfuric acid component, separating a negative electrode material from the negative electrode freed of the sulfuric acid component, immersing the negative electrode material in a 1 mol/l NaOH aqueous solution, desalting the solution freed of an insoluble component by filtration, and then concentrating and drying the solution has a sulfur element (S element) content of 3000 μmol/g or more. Accordingly it can be ensured that the lead-acid battery is hardly broken at the lug in PSOC applications.

These aspects each constitute one aspect of the present invention, and it is not necessary to satisfy all of these aspects.

BRIEF DESCRIPTION OF THE DRAWINGS

FIG. 2(a) shows a first modification, FIG. 2(b) shows a second modification, FIG. 2(c) shows a third modification, FIG. 2(d) shows a fourth modification, 2(e) shows a fifth modification, FIG. 2(f) shows a sixth modification, FIG. 2(g) shows a seventh modification, FIG. 2(h) shows an eighth modification, and FIG. 2 (i) shows a ninth modification.

MODE FOR CARRYING OUT THE INVENTION

One aspect of the present invention provides a lead-acid battery including a negative electrode material. The negative electrode material contains an organic expander. The organic expander contains a sulfur element (S element) in an amount of 3000 μmol/g or more. Accordingly, the lead-acid battery is hardly broken at the lug in PSOC applications.

Here, a negative electrode current collector may include at least two horizontal frame ribs in the upper part and the lower part, and at least two vertical frame ribs on the left part and the right part. Accordingly, the lead-acid battery is hardly broken at the lug in PSOC applications.

Here, the sulfur element (element S) content in the organic expander may be 3800 μmol/g or more. Accordingly, the lead-acid battery is more hardly broken at the lug in PSOC applications.

Here, the sulfur element (element S) content in the organic expander may be 4000 μmol/g or more. Accordingly, the lead-acid battery is more hardly broken at the lug in PSOC applications.

Here, the sulfur element (element S) content in the organic expander may be 4800 μmol/g or more. Accordingly, in PSOC applications, the potential difference between the lug portion of the negative electrode and the lower part of the negative electrode during charge can be reduced, and further, breakage at the lug hardly occurs.

Here, the sulfur element (element S) content in the organic expander may be 4900 μmol/g or more. Accordingly, in PSOC applications, the potential difference between the lug portion of the negative electrode and the lower part of the negative electrode during charge can be further reduced, and the potential difference between the lug portion of the negative electrode and the lower part of the negative electrode during charge can be further reduced, and further, breakage at the lug hardly occurs.

Here, the sulfur element (element S) content in the organic expander may be 6000 μmol/g or less. By setting the content of the sulfur element (S element) in the organic expander to 6000 μmol/g or less, a battery excellent in low-temperature high rate discharge performance and low rate discharge performance can be obtained.

Here, the negative electrode material may contain the organic expander in an amount of 0.05 mass % or more and 0.5 mass % or less. When the concentration of the organic expander in the negative electrode material is in a range of 0.05 mass % or more and 0.5 mass % or less, the tendency of the low-temperature high rate, the 0.2 Ca discharge duration time, the lug thickness residual ratio and the potential difference between the negative electrode lug portion and the negative electrode lower part during charge can be made constant.

One aspect of the present invention provides a lead-acid battery in which a powder sample obtained by taking out a negative electrode from the lead-acid battery, washing the negative electrode to remove a sulfuric acid component, separating a negative electrode material from the negative electrode freed of the sulfuric acid component, immersing the negative electrode material in a 1 mol/l NaOH aqueous solution, desalting the solution freed of an insoluble component by filtration, and then concentrating and drying the solution has a sulfur element (S element) content of 3000 mol/g or more. Accordingly, the lead-acid battery is hardly broken at the lug in PSOC applications.

Here, a negative electrode current collector may include at least two horizontal frame ribs in the upper part and the lower part, and at least two vertical frame ribs on the left part and the right part. Accordingly the lead-acid battery is more hardly broken at the lug in PSOC applications.

Here, the sulfur element (element S) content in the powder sample may be 3800 mol/g or more. Accordingly, the lead-acid battery is more hardly broken at the lug in PSOC applications.

Here, the sulfur element (element S) content in the powder sample may be 4000 μmol/g or more. Accordingly, the lead-acid battery is further hardly broken at the lug in PSOC applications.

Here, the content of sulfur element (S element) in the powder sample may be 4800 μmol/g or more. Accordingly, in PSOC applications, the potential difference between the lug portion of the negative electrode and the lower part of the negative electrode during charge can be reduced, and further, breakage at the lug hardly occurs.

Here, the content of sulfur element (S element) in the powder sample may be 4900 μmol/g or more. Accordingly, in PSOC applications, the potential difference between the lug portion of the negative electrode and the lower part of the negative electrode during charge can be further reduced, and further, breakage at the lug hardly occurs.

Here, the content of sulfur element (S element) in the powder sample may be 6000 μmol/g or less. By setting the content of the sulfur element (S element) in the organic expander to 6000 μmol/g or less, a battery excellent in low-temperature high rate discharge performance and low rate discharge performance can be obtained.

Here, the negative electrode material may contain the powder sample in an amount of 0.05 mass % or more and 0.5 mass % or less. When the concentration of the powder sample in the negative electrode material is in a range of 0.05 mass % or more and 0.5 mass % or less, the tendency of the low-temperature high rate, the 0.2 Ca discharge duration time, the lug thickness residual ratio and the potential difference between the negative electrode lug portion and the negative electrode lower part during charge can be made constant.

One aspect of the present invention provides a method for producing a lead-acid battery. The method includes preparing a negative electrode. The negative electrode includes a negative electrode material. The negative electrode material contains an organic expander. The organic expander contains a sulfur element (S element) in an amount of 3000 μmol/g or morel. Accordingly, the lead-acid battery is hardly broken at the lug in PSOC applications.

One aspect of the present invention provides a method for producing a lead-acid battery. The method includes preparing a negative electrode in which a powder sample obtained by taking out a negative electrode from the lead-acid battery, washing the negative electrode to remove a sulfuric acid component, separating a negative electrode material from the negative electrode freed of the sulfuric acid component, immersing the negative electrode material in a 1 mol/l NaOH aqueous solution, desalting the solution freed of an insoluble component by filtration, and then concentrating and drying the solution has a sulfur element (S element) content of 3000 μmol/g or more. Accordingly, the lead-acid battery is hardly broken at the lug in PSOC applications.

In the lead-acid battery according to one aspect of the present invention, the lug portion of the negative electrode plate is hardly broken, and thus the life of a lead-acid battery for PSOC use such as a lead-acid battery for an idling-stop vehicle (lead-acid battery used in a poor charged state) is improved. This lead-acid battery is particularly suitable for use in idling-stop vehicles.

Since when the concentration of the organic expander is in a range of 0.05 mass % or more and 0.5 mass % or less, the tendency of the low-temperature high rate, the 0.2 CA discharge duration time, the lug thickness residual ratio and the potential difference between the negative electrode lug portion and the negative electrode lower part during charge is constant, the content of the organic expander is preferably 0.05 mass % or more and 0.5 mass % or less, especially preferably 0.05 mass % or more and 0.35 mass % or less in terms of a mass % concentration in the electrode material.

Measuring Method

Identification of a type of an organic expander in the negative active material is performed in the following manner. A fully charged lead-acid battery is disassembled, and a negative electrode plate is taken out, washed with water to remove a sulfuric acid component, and dried. An active material is separated from the negative electrode plate, and immersed in a 1 mol/l NaOH aqueous solution to extract an organic expander. The solution freed of insoluble components by filtration is desalted, and then concentrated and dried to obtain a powder sample. The powder sample is diluted with distilled water, and the type of an organic expander is identified by an ultraviolet-visible absorption spectrum obtained using an ultraviolet-visible absorption spectrometer. When the organic expander type cannot be sufficiently identified with the ultraviolet-visible light absorption spectrum, a powder sample obtained by concentration and drying is separately provided, and other analytical instruments capable of analyzing a structure, for example infrared spectrometer (IR) and NMR are used.

The content of the organic expander in the negative active material is measured in the following manner. A fully charged lead-acid battery is disassembled, and a negative electrode plate is taken out, washed with water to remove a sulfuric acid component, and dried. An active material is separated from the negative electrode plate, and 100 g of the active material is immersed in a 300 ml of a 1 mol/l NaOH aqueous solution to extract an organic expander. The solution freed of insoluble components by filtration is removed, an ultraviolet-visible absorption spectrum is then measured, and the content of the organic expander in the active material is measured using a calibrated curve prepared in advance.

The S element content of the organic expander in the negative active material (hereinafter simply referred to as a "S element content") is measured in the following manner. A fully charged lead-acid battery is disassembled, and a negative electrode plate is taken out, washed with water to remove a sulfuric acid component, and dried. An active material is separated from the negative electrode plate, and immersed in a 1 mol/l NaOH aqueous solution to extract an organic expander. The solution freed of insoluble components by filtration is desalted, and then concentrated and dried to obtain a powder sample. The obtained powder sample is subjected to an oxygen combustion flask method to convert a S element in 0.1 g of the organic expander into sulfuric acid, and the eluent is titrated with barium perchlorate using thorin as an indicator to determine the amount of S element content is determined.

As the current collector, an expanded current collector, a current collector having a banded texture, or a punched current collector may be used.

Examples of the current collector to be used in a lead-acid battery include expanded current collectors obtained by extending a lead alloy sheet provided with a zigzag slit. In addition, examples of the current collector to be used in a lead-acid battery include cast current collectors. The cast current collector is a current collector produced by pouring molten lead into a grid mold and solidifying the lead. The cast current collector has a higher degree of freedom in design of arrangement of grid bars as compared to the expanded current collector. However, when the thickness of the current collector is to be reduced, molten lead hardly flows well in pouring of the lead into a mold, and therefore it is difficult to reduce the thickness of the current collector.

Current collectors capable of solving this difficulty include punched current collectors (see JP-A-2014-235844). The punched current collector is a current collector produced by punching a rolled sheet composed of a lead alloy. The punched current collector allows a current collector design to be more freely made as compared to the expanded current collector and the cast current collector. In addition, the punched current collector allows the current collector to have a smaller thickness as compared to the cast current collector.

The current collector may include a lead alloy having a banded texture. The lead alloy having a banded texture is, for example, one obtained by rolling a lead alloy. When the lead alloy is rolled and thinned, lead particles which are contained in the original lead alloy and form a metallic structure are collapsed, so that a banded texture appears in the advancing direction of rolling. When the current collector is produced by casting, the lead alloy that forms the current collector does not have a banded texture. A lead alloy having a banded texture has an advantage of high strength.

The current collector can be produced by removing portions excluding a lug portion, frame ribs and grid bars from a rolled sheet composed of a lead alloy having a banded texture by cutting processing. The current collector thus produced has a through-hole. The cutting processing is, for example, press processing such as punching processing, water jet processing, laser processing or the like. Since products can be processed in a large quantity inexpensively by press processing such as punching, it is preferable to perform cutting by press processing such as punching.

The grid cross section of the grid bar (grid wire) of the punched current collector may have a tetragonal shape, a pentagonal shape, a hexagonal shape, an octagonal shape, an elliptical shape or the like.

When the grid cross section of the grid bar (grid wire) of the punched current collector has a hexagonal shape or an octagonal shape, bondability between a paste (negative active material) and the punched current collector can be enhanced compared to the punched current collector with the grid bar having a tetragonal shape in the cross section.

The negative electrode current collector may include at least two horizontal frame ribs in the upper part and the lower part, and at least two vertical frame ribs on the left part and the right part. Here, it is difficult to provide a vertical rib in a normal expanded collector, therefore a cast current collector or a punched current collector is preferable.

The frame rib is a rib that is arranged so as to be connected in the longitudinal or lateral direction, and the frame rib is not required to be straight, and not required to be connected from one end to the other end of the current collector. However, for suppressing the resistance of the current collector, it is necessary that the frame rib be arranged so as to be connected in the vertical direction and the horizontal direction.

Frame ribs 4, 5, 6 and 7 may vertically run inside the outermost periphery of the current collector. In addition, the current collector may have three horizontal frame ribs in the upper part and the lower part and at the center in the height direction. Similarly, the current collector may have three vertical frame ribs on the left and the right and at the center in the horizontal direction.

In the height direction of the current collector, a side on which the lug portion is situated corresponds to the upper part, and a side opposite to the lug portion corresponds to the lower part. The horizontal direction of the current collector refers to the left and right when the side on which the lug is situated corresponds to the upper part.

Figure 1:
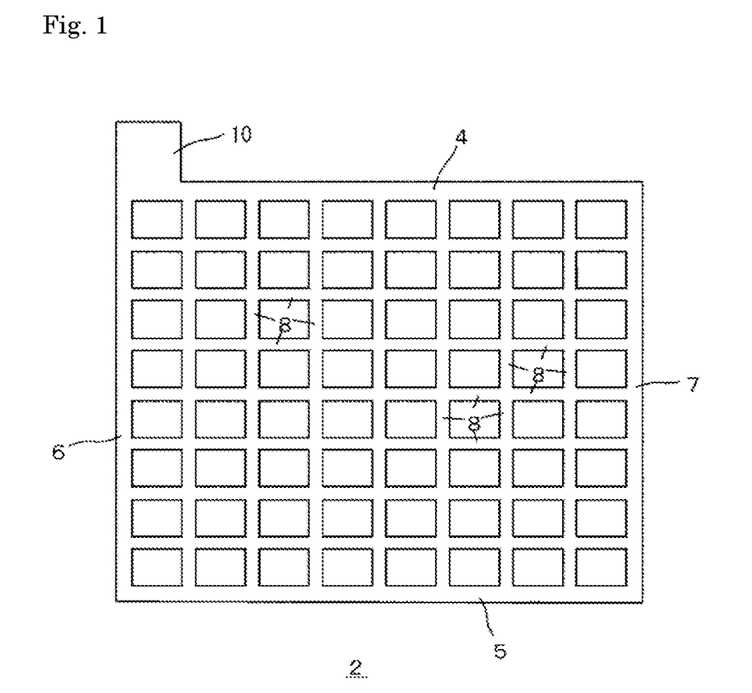
FIG. 1 is a front view of a negative electrode plate.

It is preferable that frame ribs 4, 5, 6 and 7 are present on the four peripheral sides of the current collector as shown in FIG. 1 because handling during production is easy.

Bars of the current collector may be arranged in the longitudinal direction or in an oblique direction, and resistance between upper and lower side frame ribs 4 and 5 is smaller when the bars are arranged in the longitudinal direction. In the expanded current collector, the bars are arranged in an oblique direction. In the punching current collector and the cast grid, bars 8 are generally arranged in vertical and horizontal directions. However, it is also possible to arrange the bars in an oblique direction, and it is also possible to arrange the bars in vertical, horizontal and oblique directions.

Comparison between a punching current collector in which bars are arranged in an oblique direction and an expanded grid shows that the punching current collector is more preferable because it has smaller resistance between upper and lower horizontal frame ribs 4 and 5.

The organic expander is preferably a synthetic organic expander, particularly preferably a bisphenol condensation product or a naphthalene condensation product. The S element content may be adjusted by introducing a substituent having a sulfonic acid group such as —CHNH$_2$SO$_3$H to conventional lignin. Further, a plurality of organic expanders having different S element contents may be used in combination. What contributes to the corrosion resistance of the lug portion of the negative electrode plate is an organic expander having a S element content of 3000 µmol/g or more, and thus it is important to contain the organic expander. The kind of lead powder, production conditions, the content of red lead, and so on are arbitrary.

A condensation product of sulfonic acid group-containing bisphenol A with formaldehyde, or a condensation product of sulfonic acid group-containing bisphenol S with formaldehyde may be used as the organic expander. Alternatively, a mixture of bisphenols A, F, and S may be condensed, and then sulfonated. In this way, the S element content can be adjusted within a range of 3000 µmol/g to 7500 µmol/g. The condensation product derived from bisphenol A contains a sulfonic acid group, and the condensation product derived from bisphenol S contains a sulfonic acid group and a sulfonyl group.

In place of a bisphenol-based organic expander (bisphenol condensation product), a naphthalene-based expander with a sulfonic acid group introduced into a condensation product of naphthalene with a methylene group or the like may be used.

The organic expander is preferably a synthetic organic expander, particularly preferably a bisphenol condensation product or a naphthalene condensation product. The S element content may be set to 3000 µmol/g or more, more preferably 3800 µmol/g or more by introducing a substituent having a sulfonic acid group such as —CHNH$_2$SO$_3$H to conventional lignin. Further, an organic expander having an S element content of less than 3000 µmol/g and an organic expander having an S element content of 3000 µmol/g or more, more preferably 3800 µmol/g or more may be used in combination. What contributes to the corrosion resistance of the lug portion of the negative electrode plate is an organic expander having a S element content of 3000 µmol/g or more, more preferably 3800 µmol/g or more, and thus it is important to contain this organic expander. The kind of lead powder, production conditions, the content of red lead, and so on are arbitrary.

Structure of Lead-Acid Battery

FIG. 1 shows a negative electrode grid 2 in an example. Reference numerals 4 and 5 denote upper and lower horizontal frame ribs, and reference numerals 6 and 7 denote left and right vertical frame ribs. The grid is a punching grid obtained by punching a Pb alloy and may be a cast grid. The punching grid is different from a usual expanded grid in that charge-discharge easily occurs over a wider range up to the lower part of the negative electrode grid 2 because there are vertical frames 6 and 7. Reference numeral 8 denotes vertical and horizontal bars, where an opening of the negative electrode grid 2 is filled with a negative electrode material (negative active material) to obtain a negative electrode plate.

Existence of frame ribs 4, 5, 6 and 7 on the four peripheral sides of the grid 2 is illustrative, and frame ribs 4, 5, 6 and 7 may be arranged so as to be vertically connected inside the four peripheral sides of the grid 2. In addition, the grid may be a grid having three horizontal frame ribs in the upper part and the lower part and at the center in the height direction, and having three vertical frame ribs on the left and the right and at the center in the horizontal direction. Further, the thickness, and longitudinal and lateral size of the negative electrode grid 2, the opening ratio of the grid 2 (ratio of the area of an opening surrounded by bars 8 and the apparent area of the grid), and the like are arbitrary. In the punching grid and the cast grid, bars 8 are arranged in vertical and horizontal directions, whereas in the expanded grid, the bars are arranged in an oblique direction. The bars of the grid may be arranged in the longitudinal direction or in an oblique direction, and the resistance between upper and lower horizontal frame ribs 4 and 5 is smaller when the bars are arranged in the vertical direction. Comparison between a grid in which bars are arranged in an oblique direction and an expanded grid shows that the punching grid is more preferable because it has smaller resistance between upper and lower horizontal frame ribs 4 and 5.

When frame ribs 4, 5, 6 and 7 are present on the four peripheral sides of the grid 2, the current collector is easily handled during producing, and a shapes is preferable in which frame ribs 4, 5, 6 and 7 are present on the four peripheral sides of the grid 2.

Figure 2:
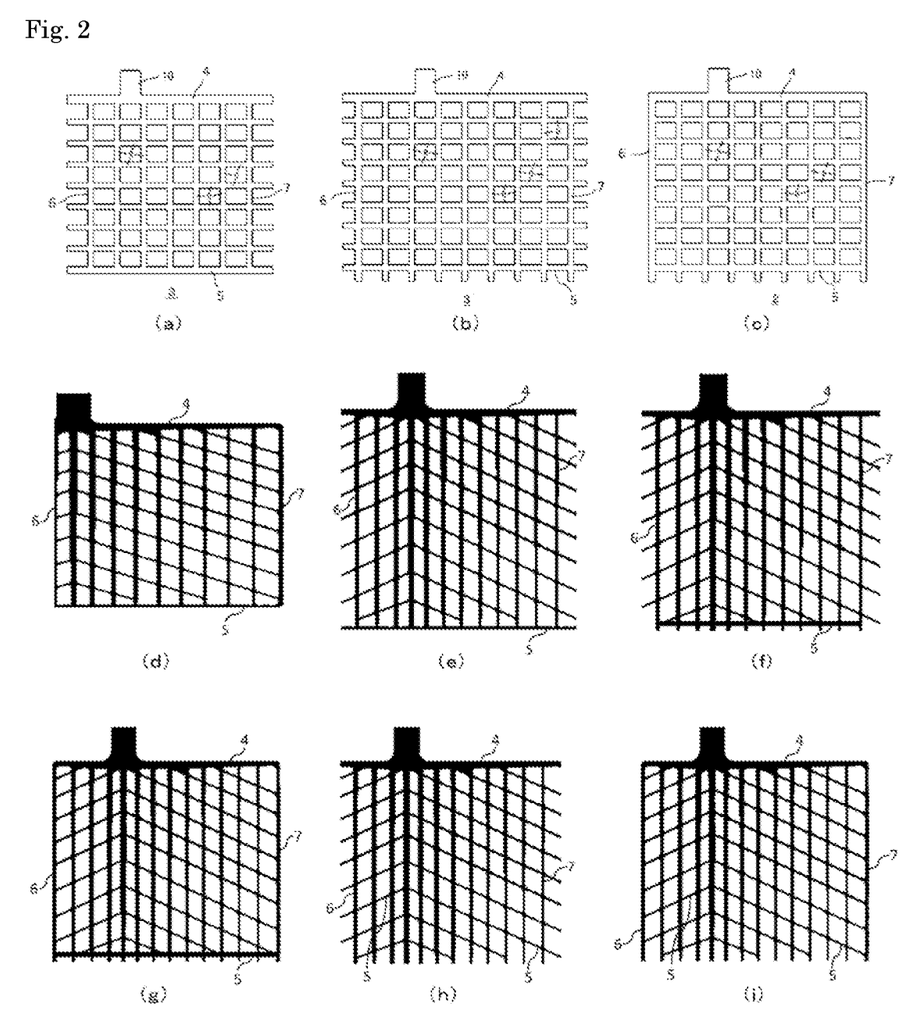
FIG. 2 shows front views of negative electrode plates in modifications, where

FIGS. 2(*a*), 2(*b*) and 2(*c*) show negative electrode grids in modifications, and a negative electrode grid 3 in FIG. 2(*a*) does not have vertical frame ribs 6 and 7 on the outer periphery. A negative electrode grid 3' in FIG. 2(*b*) does not have vertical frame ribs 6 and 7 and a lower horizontal frame rib 5 on the outer periphery, and a negative electrode grid 2' in FIG. 2(*c*) has vertical frame ribs 6 and 7, but does not have the lower horizontal frame rib 5.

FIG. 2(*d*) shows a modification of the grid in FIG. 1, where the bar is oblique.

FIGS. 2(*e*), 2(*f*), 2(*g*), 2(*h*) and 2(*i*) show modifications of the grids of FIGS. 2(*a*), 2(*b*) and 2(*c*), where the bar is oblique.

A positive electrode current collector does not necessarily include a punching grid and a cast grid, and may include an expanded grid or a spine in a tubular plate. However, in order to promote charge-discharge in the lower part, it is preferable that as with the negative electrode grid, a positive electrode grid including at least two horizontal frames in the upper part and the lower part, and at least two vertical frames on the left part and the right part, for example frames on the four peripheral sides of the grid is used. The type of storage battery may be a liquid type or valve regulated type.

Hereinafter, an optimum example of the invention of the present application will be shown. In carrying out the invention of the present application, the example can be appropriately changed in accordance with common knowledge of those skilled in the art and disclosure of the prior art. The electrode plate includes a current collector such as a grid, and an electrode material supported by the current collector. The electrode material includes a material that is not involved in an electromotive reaction, such as a bisphenol condensation product, carbon black, barium sulfate, a synthetic fiber-reinforced material. The negative electrode material is a material containing spongy lead as a main component, and the positive electrode material is a material containing lead dioxide as a main component. The electrode material is referred to as an active material for the sake of simplicity in the example. An organic expander may be simply referred to as an expander.

Even when the shape of the current collector is not a grid shape, the current collector may be simply referred to as a grid.

EXAMPLES

Production of Lead-Acid Battery

A lead powder, an organic expander including a bisphenol condensation product, carbon black, barium sulfate and a synthetic fiber reinforcing agent were mixed with water and sulfuric acid to obtain a negative active material paste. 0.2 mass % of the organic expander, 0.2 mass % of the carbon black, 1.0 mass % of the barium sulfate and 0.05 mass % of the synthetic fiber reinforcing agent were contained to the negative active material (strictly speaking, negative electrode material) after formation. As a preferred range of each of these components, the content of the organic expander is 0.05 mass % or more and 0.5 mass % or less, and the content of carbon black is 1.0 mass % or less. The carbon black may be replaced by other carbon such as graphite. It is preferable that barium sulfate is contained in an amount of 0.5 mass % or more and 2.0 mass % or less, and the synthetic fiber reinforcing agent is contained in an amount of 0.03 mass % or more and 0.2 mass % or less. A negative active material paste was filled into a punching grid composed of a Pb—Ca—Sn-based alloy and having frames on the four peripheral sides, and dried and cured to obtain an unformed negative electrode plate. A negative electrode grid 2 and a positive electrode grid had a longitudinal and lateral size of 115.0 mm in length×101.0 mm in width, and the negative electrode grid 2 had a thickness of 0.7 mm, the positive electrode grid had a thickness of 0.95 mm, a horizontal frame 4 had a thickness of 2.5 mm, a horizontal frame 5 had a thickness of 2.0 mm, and vertical frames 6 and 7 had a thickness of 2.0 mm.

In the example, a condensation product of sulfonic acid group-containing bisphenol A with formaldehyde, or a condensation product of sulfonic acid group-containing bisphenol S with formaldehyde was used as the organic expander. Conditions for sulfonation were intensified as compared to the conventional conditions, so that the average number of sulfonic acid groups per bisphenol molecule was adjusted so as to be larger than conventional. In this way, the S element content was adjusted within a range of 3000 μmol/g to 7500 μmol/g. The condensation product derived from bisphenol A contains a sulfonic acid group, and the condensation product derived from bisphenol S contains a sulfonic acid group and a sulfonyl group. Apart from this, lignin sulfonic acid having an S element content of 600 μmol/g was used as a conventional example.

In addition, a naphthalene-based expander with a sulfonic acid group introduced into a condensation product of naphthalene with a methylene group or the like, etc. was used in place of a bisphenol-based organic expander (bisphenol condensation product).

The organic expander is preferably a synthetic organic expander, particularly preferably a bisphenol condensation product or a naphthalene condensation product. The S element content may be set to 3000 μmol/g or more, more preferably 3800 μmol/g or more by introducing a substituent having a sulfonic acid group such as —CHNH$_2$SO$_3$H to conventional lignin. Further, an organic expander having an S element content of less than 3000 μmol/g and an organic expander having an S element content of 3000 μmol/g or more, more preferably 3800 μmol/g or more may be used in combination. What contributes to the corrosion resistance of the lug portion of the negative electrode plate is an organic expander having a S element content of 3000 μmol/g or more, more preferably 3800 μmol/g or more, and thus it is important to contain this organic expander. The kind of lead powder, production conditions, the content of red lead, and so on are arbitrary.

A lead powder and a synthetic fiber reinforcing agent (0.1 mass % based on a formed positive active material) were mixed with water and sulfuric acid to obtain a positive active material paste. The paste was filled into a punching grid composed of a Pb—Ca—Sn-based alloy and having frames on the four peripheral sides, and dried and cured to obtain an unformed positive electrode plate. The negative electrode plate was surrounded by a bag-shaped microporous polyethylene separator. An element was formed by five negative electrode plates and four positive electrode plates, and placed in a polypropylene container. Sulfuric acid was added to perform formation-in-container, so that a liquid-type automotive battery for an idling-stop vehicle was obtained. The rating capacity of five-hour rate is 25 Ah, and the power is 12 V.

The use of the battery is arbitrary without being limited to the automobile use, and the type of the battery may be a liquid type or valve regulated type.

A battery using expanded grids for positive and negative electrode plates was produced. Longitudinal and lateral sizes and thickness of the grid and the diameter of upper and lower horizontal frames were identical to the battery in the former example but had no vertical frame.

Initial Performance Test

For each lead-acid battery, the initial value of low-temperature high rate discharge performance (the number of seconds until the terminal voltage decreases to 6.0 V under the condition of a discharge current of 150 A at −15° C.), and the 0.2 CA discharge duration time until the terminal voltage decreases to 10.5 V at a discharge current of 0.2 CA were measured. As the organic expander, the bisphenol condensation product, lignin sulfonic acid (S element content: 600 μmol/g) or a sulfonated naphthalene condensation product were used. For each sample, the concentration in the negative active material was set to a standard concentration of 0.2 mass %.

Figure 3:
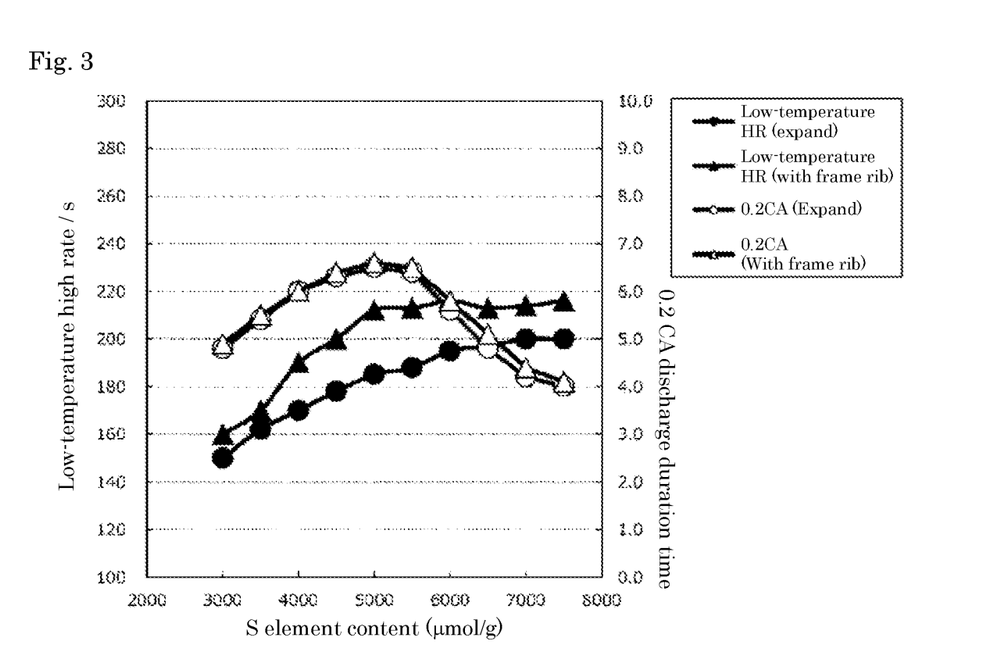
FIG. 3 is a characteristic diagram showing influences of the S element content in an organic expander on low-temperature high rate discharge performance and low rate discharge performance for a punching grid and an expanded grid.

Table 1 and FIG. 3 show initial values of low-temperature high rate discharge performance and initial values of 0.2 CA discharge duration time. Note that "with frame rib" indicates the punching grid in FIG. 1, and so on. The low-temperature high rate discharge performance increased with the S element content, and in the punching grid, the low-temperature high rate discharge performance increased more significantly with an increase in S element content than in the expanded grid. In both the punching grid and the expanded grid, the same 0.2 CA discharge duration time was attained, and a peak of the 0.2 CA discharge duration time was present at a S element content of 4000 μmol/g to 6000 μmol/g. The S element content is preferably 4000 μmol/g or more and 6000 μmol/g or less because both the low-temperature high rate and the initial value discharge performance of the 0.2 CA discharge duration time can be used within a more preferable range.

TABLE 1

Relationship between S element content in organic expander and initial performance

| | | S element content/μmol/g | | | | | | | | | | |
|---|---|---|---|---|---|---|---|---|---|---|---|---|
| | | 3000 | 3500 | 4000 | 4500 | 5000 | 5500 | 6000 | 6500 | 7000 | 7500 | 600* |
| Low-temperature high rate discharge duration time/s | Expand | 150 | 162 | 170 | 178 | 185 | 188 | 195 | 197 | 200 | 200 | 153 |
| | With frame rib | 160 | 170 | 190 | 200 | 212 | 213 | 216 | 213 | 214 | 216 | 158 |
| 0.2 CA discharge duration time/h | Expand | 4.8 | 5.4 | 6.0 | 6.3 | 6.5 | 6.4 | 5.6 | 4.8 | 4.2 | 4.0 | 4.8 |
| | With frame rib | 4.9 | 5.5 | 6.0 | 6.4 | 6.6 | 6.5 | 5.8 | 5.1 | 4.4 | 4.1 | 5.2 |

*A sample having an S element content of 600 μmol/g is composed of lignin sulfonic acid.

Figure 4:
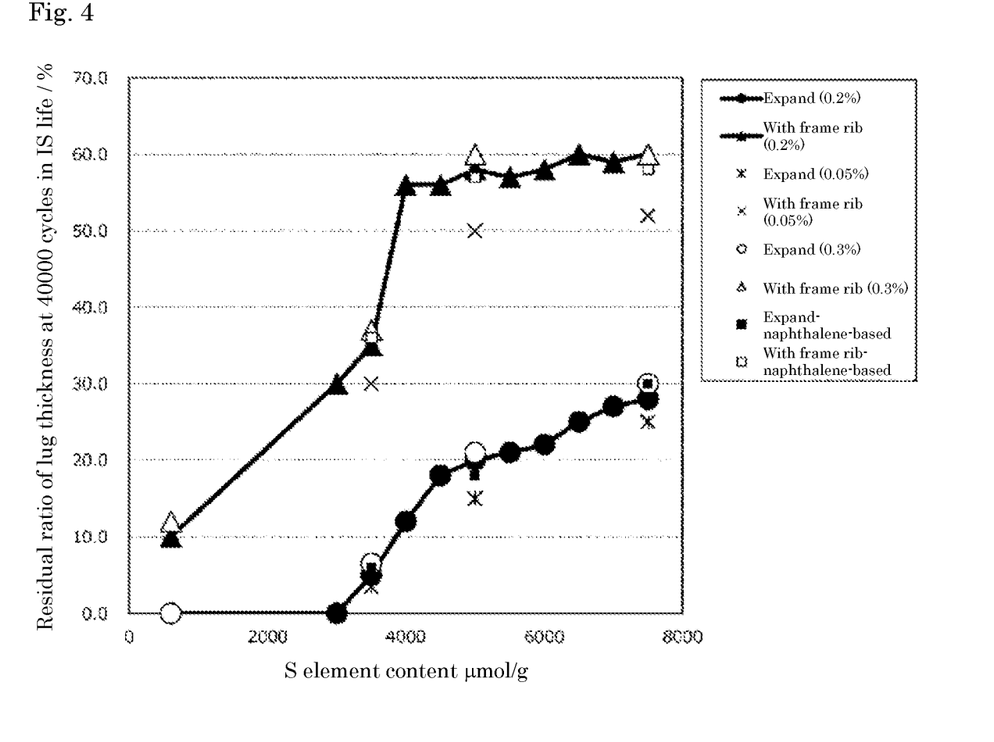
FIG. 4 is a characteristic diagram showing a relationship between the S element content in the organic expander and the residual ratio of the lug portion thickness after an idling-stop life test for the punching grid and the expanded grid.

In accordance with to the SBA (Standard of Battery Association of Japan) S0101 9.4.5 2006, each lead-acid battery was subjected to an idling-stop life test of 40,000 cycles, and disassembled after the test, and the residual ratio of the negative electrode lug portion thickness (ratio of thickness after 40,000 cycles to initial thickness) was measured. Table 2 and FIG. 4 show effects of the punching grid (with frame rib) and the expanded grid, and effects of the S element content of the organic expander (0.05 to 0.3 mass %).

The grid with frame ribs had a higher residual ratio of the lug portion thickness as compared to the expanded grid. The residual ratio of the lug portion thickness sharply increased when the S element content of the organic expander was between 3000 μmol/g and 4000 μmol/g, and the concentration of the organic expander itself did not have a large effect. Even when a naphthalene condensation product was used in place of a bisphenol condensation product, similar results were obtained as long as there was no difference in S element content as shown in Table 2 (not shown in FIG. 4). These facts suggest that when the S element content of the organic expander is 3000 μmol/g or more, preferably 3800 μmol/g or more, especially preferably 4000 μmol/g or more, a situation can be prevented in which the life of a lead-acid battery for an idling-stop vehicle is ended due to breakage of the lug portion.

Further, it is suggested that when a grid having frames on the four peripheral sides and the like is used, and the S element content of the organic expander is 3000 μmol/g or more, preferably 3800 μmol/g or more, especially preferably 4000 μmol/g or more, a situation can be prevented in which the life of a lead-acid battery for an idling-stop vehicle is ended due to breakage of the lug portion.

TABLE 2

Relationship between S element content in organic expander and type of current collector and residual ratio of lug portion

| | | Organic shrinkage preventing agent type | | | | | | | | | | |
|---|---|---|---|---|---|---|---|---|---|---|---|---|
| | | Lignin | Bisphenol-based organic expander | | | | | | | | | |
| | | Addition amount of organic shrinkage preventing agent/mass % | | | | | | | | | | |
| | | 0.2 | | | | | | | | | | |
| S element content/μmol/g | | 600 | 3000 | 3500 | 4000 | 4500 | 5000 | 5500 | 6000 | 6500 | 7000 | 7500 |
| Residual ratio of lug portion thickness (at 40000th cycle in IS life cycles) | Expand | 0.0 | 0.0 | 5.0 | 12.0 | 18.0 | 20.0 | 21.0 | 22.0 | 25.0 | 27.0 | 28.0 |
| | With frame rib | 10.0 | 30.0 | 35.0 | 56.0 | 56.0 | 58.0 | 57.0 | 58.0 | 60.0 | 59.0 | 60.0 |

| | | Organic shrinkage preventing agent type | | | | | | | | | |
|---|---|---|---|---|---|---|---|---|---|---|---|
| | | Lignin | Bisphenol-based organic expander | | | Lignin | Bisphenol-based organic expander | | | Naphthalene-based organic expander | | |
| | | Addition amount of organic shrinkage preventing agent/mass % | | | | | | | | | | |
| | | 0.05 | | | | 0.3 | | | | 0.2 | | |
| S element content/μmol/g | | 600 | 3500 | 5000 | 7500 | 600 | 3500 | 5000 | 7500 | 3500 | 5000 | 7500 |
| Residual ratio of lug portion thickness (at 40000th cycle in IS life cycles) | Expand | 0.0 | 3.5 | 15.0 | 25.0 | 0.0 | 6.5 | 21.0 | 30.0 | 6.0 | 18.0 | 30.0 |
| | With frame rib | 0.0 | 30.0 | 50.0 | 52.0 | 12.0 | 37.0 | 60.0 | 60.0 | 36.0 | 57.0 | 58.0 |

* A sample having an S element content of 600 μmol/g is composed of lignin sulfonic acid.

Figure 5:
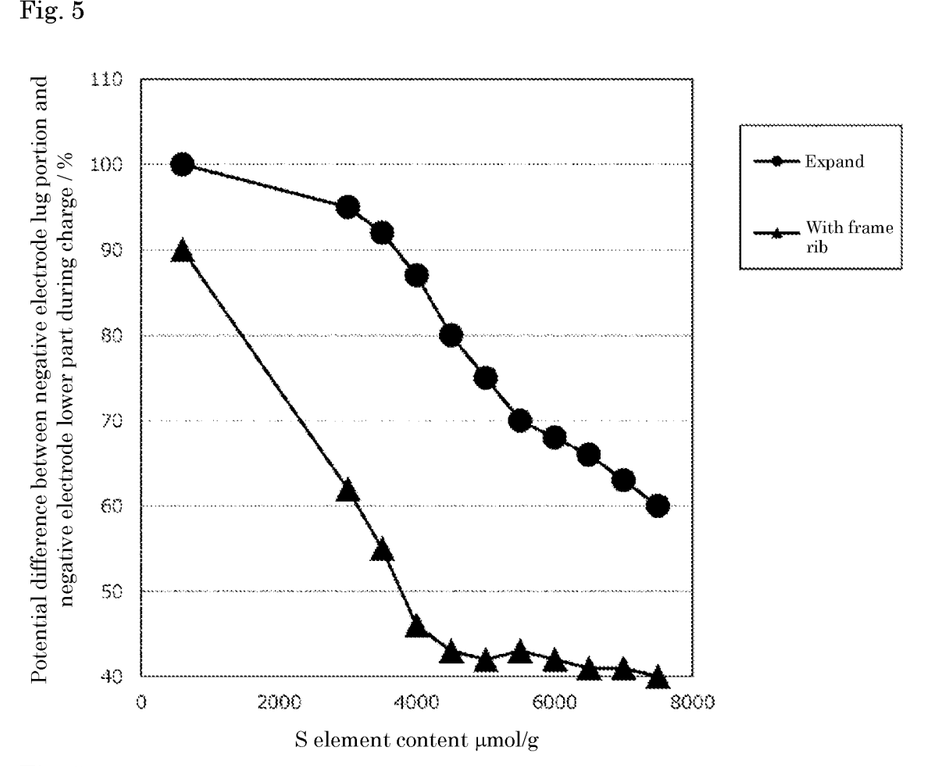
FIG. 5 is a characteristic diagram showing a relationship between the S element content in the organic expander and the potential difference between the upper part and the lower part during charge for the punching grid and the expanded grid.

After 20000 cycles during the idling-stop life test described in the SBA (Standard of Battery Association of Japan) S0101 8.4.5 2014, the lead-acid battery was discharged in a predetermined amount, then discharged at 300 A for 1 second, and charged. At the charge, a potential difference between the upper part and the lower part of the negative electrode plate was measured. (In the case of a battery of 37.5 Ah at 20 hR, the procedure is as follows: the battery is discharged at 34 A for 59 seconds, subsequently discharged at 300 A for 1 second, and then charged at 14 V (limiting current: 100 A) for 60 seconds; and a potential difference between the upper part and the lower part of the negative electrode plate at 60 seconds during charge at the elapse of 20000 cycles in the life cycles is measured.) As the potential of the lug portion, a potential of the lug portion was measured at a position near the strap, and as the potential of the lower part, a potential was measured at a distance of 2 to 3 cm from the lower end of the negative electrode plate. As the potential, a potential at 60 seconds at the end of charge was measured. Table 3 and FIG. 5 show a relationship between the type of grid and the S element content of the organic expander (bisphenol condensation product except the case where the S element content is 600 μmol/g) and the potential difference between the upper part and the lower part). The content of the organic expander in the negative active material was 0.2 mass %.

When the S element content of the organic expander was 3000 μmol/g or more, the potential difference between the negative electrode lug portion and the negative electrode lower part was reduced.

In a grid with frame ribs, the potential difference between the upper part and the lower part was small, and the potential difference between the upper part and the lower part sharply decreased when the S element content of the organic expander was between 3000 μmol/g and 4000 μmol/g.

part of the plate and the residual ratio of the thickness of negative electrode lug portion. When the S element content of the organic expander was 3000 μmol/g or more, more preferably 4000 μmol/g or more, a residual ratio equal to or higher than the threshold was achieved. The S element content of the organic expander was still more preferably 4800 μmol/g or more, and most preferably 4900 μmol/g or more. In addition, when a grid with frame ribs was used, it was possible to further reduce the potential difference between the upper part and the lower part and increase the residual ratio of the thickness of the negative electrode lug portion, as compared with the case where the S element content of the organic expander was 3000 μmol/g or more.

Figure 7:
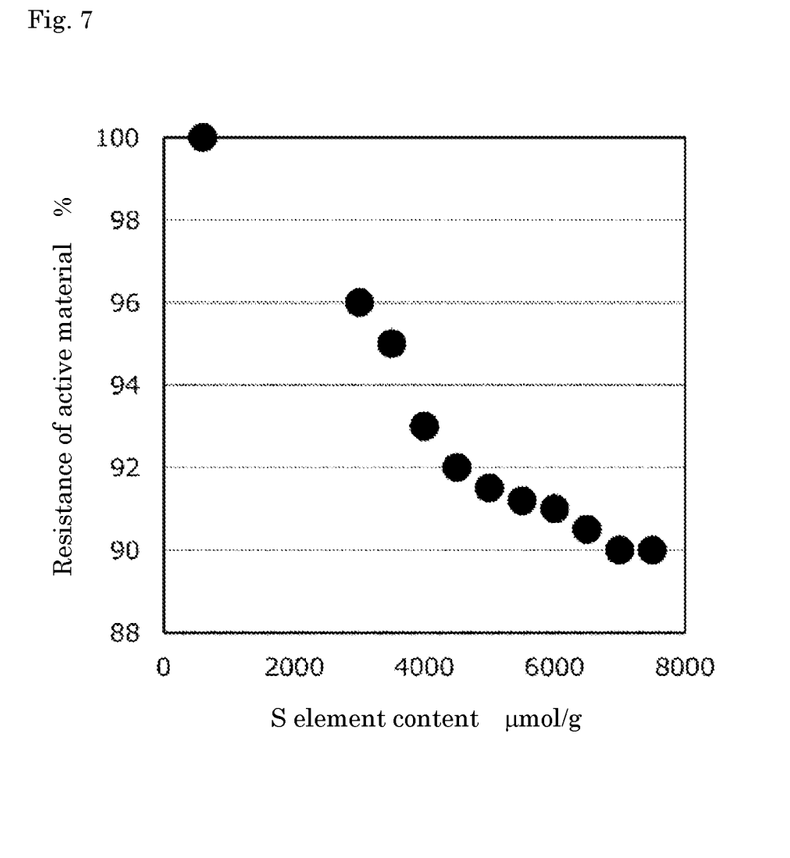
FIG. 7 is a characteristic diagram showing a relationship between the S element content in the organic expander and the resistance of a negative electrode material

The resistivity of the negative active material was measured by a four-terminal method. Table 4 and FIG. 7 show the resistivity as a relative value where the value in the conventional example with a S element content of 600 μmol/g is 100. The resistance of the active material decreased with the S element content, and the resistance of the active material sharply decreased when the S element content of the organic expander was between 3000 μmol/g and 4000 μmol/g. The content of the organic expander in the negative active material was 0.2 mass %.

TABLE 4

Relationship between S element content in organic expander and resistance of active material

| | S element content/μmol/g | | | | | | | | | | |
|---|---|---|---|---|---|---|---|---|---|---|---|
| | 600 | 3000 | 3500 | 4000 | 4500 | 5000 | 5500 | 6000 | 6500 | 7000 | 7500 |
| Resistance of active material* | 100 | 96 | 95 | 93 | 92 | 91.5 | 91.2 | 91 | 90.5 | 90 | 90 |

*Relative value where the value in the conventional example is 100

FIGS. 4 to 7 (Tables 2 to 4) show that by setting the S element content of the organic expander to 3000 μmol/g or more, more preferably 3800 μmol/g or more to reduce the resistance of the negative active material, breakage of the negative electrode lug portion was prevented.

FIGS. 4 to 7 (Tables 2 to 4) show that by setting the S element content of the organic expander to 3000 μmol/g or more, more preferably 3800 μmol/g or more to reduce the resistance of the negative active material, and using a grid with frame ribs to reduce resistance in the vertical direction, breakage of the negative electrode lug portion was prevented. Particularly, in FIG. 4, the residual ratio of the

TABLE 3

Relationship between S content in organic expander and potential difference between upper part and lower part of plate during charge

| | | S element content (μmol/g) | | | | | | | | | | |
|---|---|---|---|---|---|---|---|---|---|---|---|---|
| | | 600 | 3000 | 3500 | 4000 | 4500 | 5000 | 5500 | 6000 | 6500 | 7000 | 7500 |
| Potential difference between upper part and lower part of plate*% | Expand | 100 | 95 | 92 | 87 | 80 | 75 | 70 | 68 | 66 | 63 | 60 |
| | With frame rib | 90 | 62 | 55 | 46 | 43 | 42 | 43 | 42 | 41 | 41 | 40 |

*Relative value where the potential difference between the upper part and the lower part of the plate when lignin of S = 600 μmol/g is added to the expanded grid is 100
The potential difference during charge is a difference between a potential measured with a reference electrode tip placed in the vicinity of the lug portion of the negative electrode and a potential measured with a reference electrode tip placed in the vicinity of the lower part of the negative electrode plate.

Figure 6:
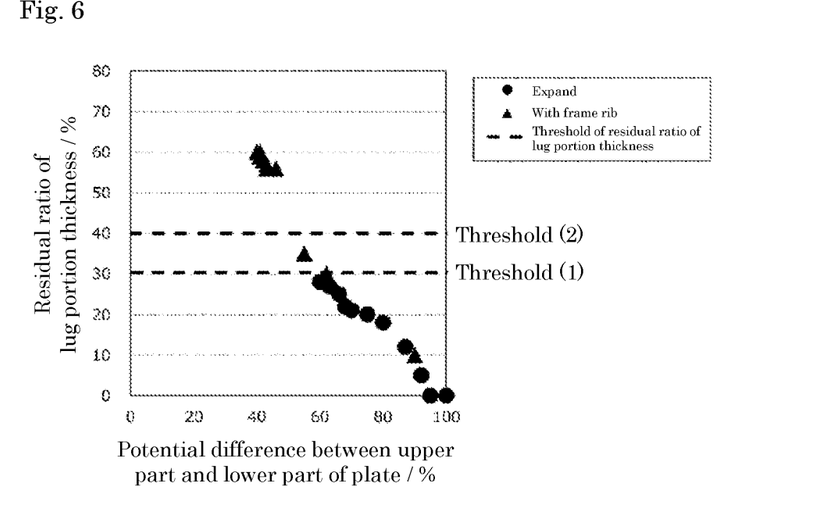
FIG. 6 is a characteristic diagram showing a relationship between the potential difference between the upper part and the lower part of the negative electrode plate and the residual ratio of a lug portion.

FIG. 6 shows a correlation between the potential difference between the upper part and the lower part of the plate as shown in Table 3 and FIG. 5 and the residual ratio of the thickness of the negative electrode lug portion as shown in Table 2 and FIG. 4. After 40,000 cycles in the idling-stop life test, the residual ratio was set to 30%, more strictly to 40%, as a threshold for ensuring that the negative electrode lug portion was normal. There was a strong correlation between potential difference between the upper part and the lower part of the plate and the residual ratio of the thickness of the lug portion is discontinuously improved when the S element content is between 3500 μmol/g and 4000 mol/g in a grid with frame ribs.

Most of S elements in the organic expander exist as sulfonic acid groups or sulfonyl groups ($SO_2$ groups). These groups are similar groups that are strongly charged or strongly polarized to enhance the hydrophilicity and surface charge of the organic expander. The inventor has confirmed that the results are almost the same when the S element in the organic expander exists as a sulfonic acid group or as a sulfonyl group.

A punching grid is shown in the example, but when the S element content of the organic expander is 3000 μmol/g or more, more preferably 3800 μmol/g or more, breakage of the negative electrode lug portion can be prevented by the same mechanism even in a cast grid.

DESCRIPTION OF REFERENCE SIGNS

2 Negative electrode grid
4, 5 Horizontal frame rib
6, 7 Vertical frame rib
8 Bar
10 Lug

The invention claimed is:

1. A lead-acid battery comprising a negative electrode material;
   wherein the negative electrode material contains an organic expander, and
   the organic expander contains a sulfur element (S element) in an amount of 4800 μmol/g or more.

2. The lead-acid battery according to claim 1, further comprising a negative electrode current collector,
   wherein the negative electrode current collector includes at least two horizontal frame ribs in an upper part and a lower part and at least two vertical frame ribs on a left part and a right part.

3. The lead-acid battery according to claim 1, further comprising a negative electrode containing the negative electrode material,
   wherein the amount of the sulfur element (S element) in the organic expander is measured as a sulfur element (S element) content in a powder sample obtained by taking out the negative electrode from the lead-acid battery, washing the negative electrode to remove a sulfuric acid component, separating the negative electrode material from the negative electrode freed of the sulfuric acid component, immersing the negative electrode material in a 1 mol/l NaOH aqueous solution, desalting the solution freed of an insoluble component by filtration, and then concentrating and drying the solution.

4. The lead-acid battery according to claim 3, further comprising a negative electrode current collector, wherein the negative electrode current collector includes at least two horizontal frame ribs in an upper part and a lower part and at least two vertical frame ribs on a left part and a right part.

5. The lead-acid battery according to claim 1, wherein the organic expander has a sulfur element (S element) content of 4900 μmol/g or more.

6. The lead-acid battery according to claim 1, wherein the organic expander has a sulfur element (S element) content of 4800 μmol/g or more and 6000 μmol/g or less.

7. The lead-acid battery according to claim 1, wherein the organic expander has a sulfur element (S element) content of 4900 μmol/g or more and 6000 μmol/g or less.

8. The lead-acid battery according to claim 1, wherein the negative electrode material contains the organic expander in an amount of 0.05 mass % or more and 0.5 mass % or less.

9. A method for producing a lead-acid battery, the method comprising:
   filling a negative electrode material in a negative electrode current collector to prepare a negative electrode, wherein
   the negative electrode material contains an organic expander, and
   the organic expander contains a sulfur element (S element) in an amount of 4800 μmol/g or more.

10. A method for measuring the amount of the sulfur element (S element) in the organic expander of the lead-acid battery produced by the method according to claim 9, the method comprising:
    obtaining a powder sample by taking out the negative electrode from the lead-acid battery, washing the negative electrode to remove a sulfuric acid component, separating the negative electrode material from the negative electrode freed of the sulfuric acid component, immersing the negative electrode material in a 1 mol/l NaOH aqueous solution, desalting the solution freed of an insoluble component by filtration, and then concentrating and drying the solution;
    subjecting the obtained powder sample to an oxygen combustion flask method to convert a S element in 0.1 g of the organic expander into sulfuric acid to obtain an eluent; and
    titrating the eluent with barium perchlorate using thorin as an indicator to determine the amount of the sulfur element (S element).

* * * * *